United States Patent [19]

Postma

[11] 4,432,777

[45] Feb. 21, 1984

[54] METHOD FOR REMOVING PARTICULATE MATTER FROM A GAS STREAM

[75] Inventor: Arlin K. Postma, Benton City, Wash.

[73] Assignee: The United States of America as represented by the United States Department of Energy, Washington, D.C.

[21] Appl. No.: 416,411

[22] Filed: Sep. 9, 1982

Related U.S. Application Data

[63] Continuation of Ser. No. 145,954, May 2, 1980, abandoned.

[51] Int. Cl.$^3$ .................... B01D 47/02; B01D 47/14
[52] U.S. Cl. .................................. 55/86; 55/95; 55/242; 55/252; 55/255; 55/256; 261/122
[58] Field of Search ................. 55/234, 242, 243, 244, 55/249, 250, 252, 253, 255, 256, 259, 86, 90, 95, 96; 261/122

[56] References Cited

U.S. PATENT DOCUMENTS

| | | | |
|---|---|---|---|
| 1,838,511 | 12/1931 | Wilson | 55/249 |
| 2,033,368 | 3/1936 | Altgelt | 180/69 R |
| 2,094,844 | 10/1937 | Kiesskalt et al. | 261/83 |
| 2,138,153 | 11/1980 | Grisdale | 23/284 |
| 2,171,172 | 9/1939 | Kamarth | 55/249 |
| 2,405,494 | 8/1946 | Dupuy | 55/252 |
| 2,409,558 | 10/1946 | Gunn | 55/95 |
| 3,282,033 | 11/1966 | Seddanen | 55/259 |
| 3,440,018 | 4/1969 | Eckert | 55/259 |
| 3,537,239 | 11/1970 | Dunmire | 55/250 |
| 3,648,439 | 3/1972 | Szczepanski | 55/223 |
| 3,735,567 | 5/1973 | Viers | 55/233 |
| 3,793,809 | 2/1974 | Tomany et al. | 55/223 |
| 3,922,152 | 11/1975 | Kookoothakis | 55/DIG. 30 |

FOREIGN PATENT DOCUMENTS

| | | |
|---|---|---|
| 187999 | 11/1922 | United Kingdom . |
| 282851 | 1/1928 | United Kingdom . |
| 526178 | 9/1940 | United Kingdom . |
| 751139 | 6/1956 | United Kingdom . |

*Primary Examiner*—David L. Lacey
*Attorney, Agent, or Firm*—Robert Southworth, III; Richard E. Constant; Richard G. Besha

[57] ABSTRACT

Particulate matter is removed from a stream of pressurized gas by directing the stream of gas upwardly through a bed of porous material, the porous bed being held in an open ended container and at least partially submerged in liquid. The passage of the gas through the porous bed sets up a circulation in the liquid which cleans the particulate matter from the bed.

1 Claim, 2 Drawing Figures

METHOD FOR REMOVING PARTICULATE MATTER FROM A GAS STREAM

The U.S. Government has rights in this invention.

This application is a continuation of Ser. No. 145,954, filed May 2, 1980, now abandoned.

BACKGROUND OF THE INVENTION

The present disclosure arose from an effort to devise an air cleaning system for use in conjunction with containment buildings and facilities for nuclear reactors. The purpose of the specific air cleaning system was to limit release of aerosol particles and absorbable gases, including radioactive materials, from containment facilities during postulated major accidents. A system was devised which requires no energy while in the passive state, and no active energy other than pressurization of the stream of gas being scrubbed. While in its passive state, the system is instantly available for usage.

The disclosed system merges desirable features of both a pool type scrubber and a sand or gravel filter into a hybrid type of scrubber.

A pool type scrubber consists of a gas inlet duct projecting downwardly into a pool of liquid. Gas flows from the inlet duct into the pool of liquid, breaks into bubbles, and then flows upwardly through the pool. Aerosols are removed from the gas in the bubbles by various forces, which generally are very dependent upon bubble diameter. Although devices can be added to the outlet of the gas duct to reduce the bubble size, these systems characteristically produce relatively large gas bubbles and are subject to plugging by aerosol deposition. Aerosol removal is correspondingly low. However, pool type scrubbers have the desirable feature of being capable of handling a large mass of collected material as it is removed from the stream of gas.

Sand or gravel filters are constructed using layers of graded granular material, with the largest granular sizes normally positioned at the bottom of the filter bed and successive layers of smaller granules arranged upwardly from the bottom layer. Gas containing aerosols pass from the bottom to the top of the bed. Aerosol is removed by inertia, diffusion, interception and gravity forces. Because of the layers of fine sized granules at the upper portions of such a bed, sand or gravel filters demonstrate a high aerosol removal efficiency. However, because such a bed contains a limited void volume, the filter can handle only a small amount of collected material per unit volume of filter and then must be replaced, flushed or otherwise cleaned.

The disclosed hybrid scrubber consists of a porous bed at least partially submerged within a pool of liquid. The porous bed might contain granular material such as sand or gravel. The liquid might be water. A pressurized stream of air or other gas laden with aerosol is directed to the bottom of the bed. It distributes itself across the bed and flows upwardly through the irregular channels formed in the bed interstices. Aerosol is removed from the gas by interception, diffusion, inertia forces, particle growth, and settling. The porous bed itself is continuously cleaned by liquid entrained with the gas. The clean gas exits from the top of the porous bed.

SUMMARY OF THE INVENTION

A passive self-cleaning aerosol scrubber for removing particulate matter from a stream of pressurized gas utilizes a liquid-tight enclosure containing a quantity of liquid that partially fills its interior. A container is positioned within the enclosure. The container has gas impervious side walls that extend from a lower end submerged in the liquid to an upper end. The upper end of the container and the porous bed within it can be located beneath, level with or above the liquid surface. A porous bed is surrounded by the gas impervious side walls of the container. The porous bed extends vertically upward from a submerged bottom elevation spaced above the lower end of the side walls of the container. A gas delivery duct extends into the enclosure and has a discharge opening at a submerged location beneath the porous bed for directing pressurized gas and particulate matter to the bottom of the porous bed. The top of the porous bed is open to permit liquid entrained within the stream of gas to be returned from within the container to the pool of liquid remaining within the enclosure. Scrubbed gas is permitted to exit through the top of the porous bed.

It is a first object of this invention to combine the particle mass collection capability of a pool scrubber with the removal efficiency of a wetted porous filter. The result is a high efficiency filter system having high particle mass collection capability.

Another object of this invention was to design a high capacity aerosol scrubber which remains in a passive state over periods of months or years, and is instantly ready for use when needed.

Another object is to provide a scrubber having no energy requirements when in its passive state. When completely enclosed, the apparatus requires no maintenance until after it has been used.

Another object is to provide a scrubber having low energy requirements during use. The scrubber is activated solely by the gaseous pressure of the stream being cleaned, and requires no external pumps or controls.

These and further objects will be evident from the following disclosure and the accompanying drawings, which illustrate one preferred form of the invention.

DESCRIPTION OF THE PREFERRED EMBODIMENT

Figure 1:
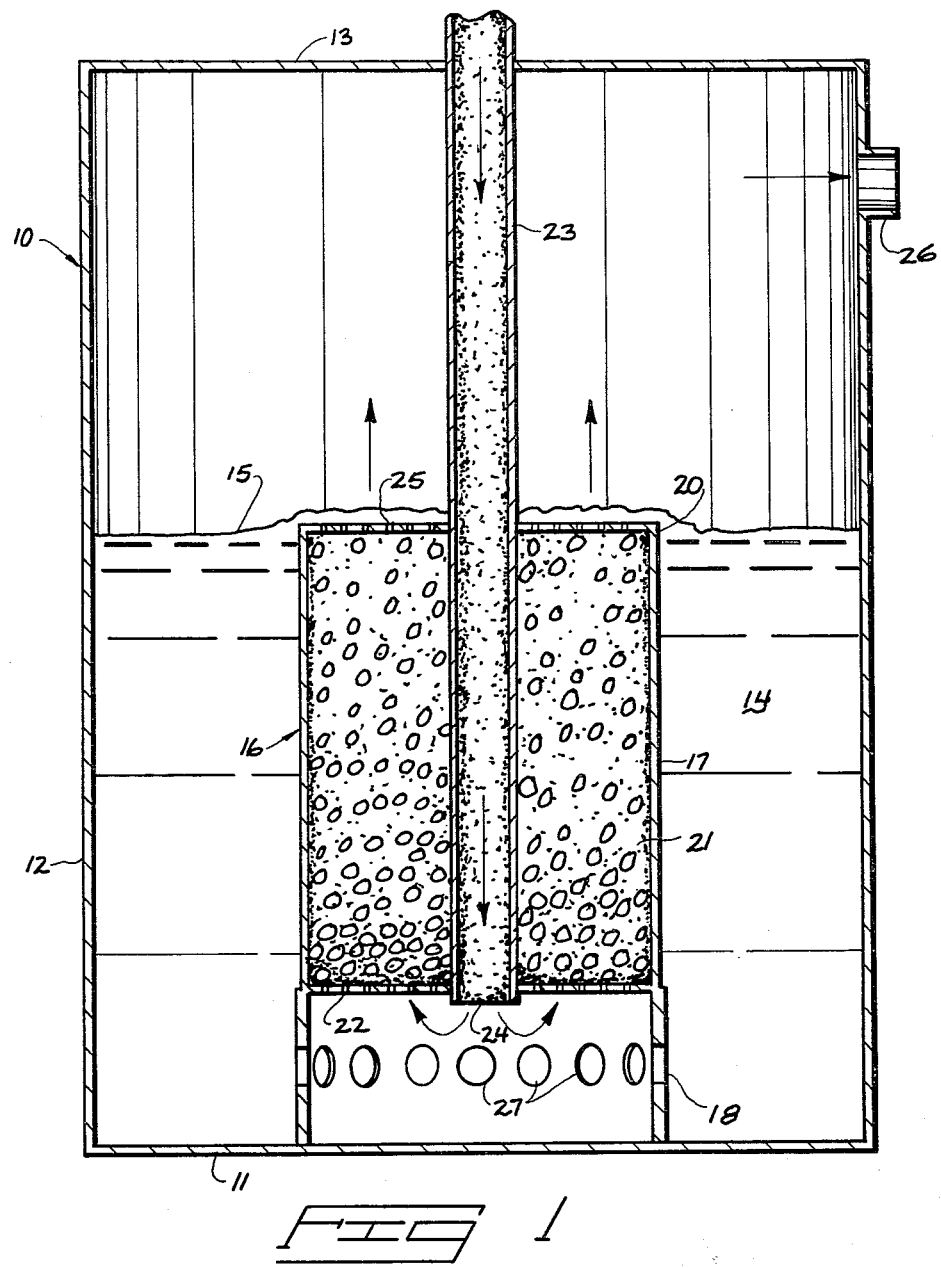
FIG. 1 shows a schematic cross-sectional view through the scrubber.

The scrubber that is the subject of this disclosure basically consists of a porous bed at least partially submerged in a pool of liquid. An incoming stream of gas is directed to the bottom of the bed. Gas flow is induced upwardly by exhausting gas from the outlet duct at the top of the apparatus. Gas laden with aerosol passes down the inlet duct and up through the irregular porous channels in the bed. Liquid is purged through the bed due to the difference in density of liquid outside the bed and the effective density of the gas-liquid mixture inside the bed. This purging action continuously washes the porous bed clean of collected aerosol.

As shown in the drawing, a practical embodiment of the device comprises a liquid-tight enclosure 10 having a bottom wall 11 and connecting upright side walls 12 defining an interior liquid tank. The tank is preferably fully enclosed and completed by a top wall 13, but can be upwardly open, as will be described below.

A quantity of liquid 14 is contained within enclosure 10. This liquid might be water or any desired liquid that is physically stable and compatible with the structure and usage of the filter. It partially fills the interior liquid tank presented by enclosure 10 to a liquid surface elevation designated by reference numeral 15.

An open ended container 16 is positioned within enclosure 10. It has gas impervious upright side walls 17 that extend from a lower end 18 to an upper end 20. The lower end of container 16 is submerged in the liquid 14. Its upper end 20 is either adjacent to, above or below the liquid surface elevation shown at 15.

A porous bed 21 of gravel or other filtering material is surrounded by the gas impervious side walls 17 of container 16. Bed 21 extends vertically upward within container 16 from a bottom location spaced above the lower end 18 of the gas impervious upright side walls 17 of container 16. This location is defined by a transverse porous or perforated plate 22 extending across the side walls 17. In the preferred embodiment as shown, approximately half of the vertical height of the porous bed 21 is located beneath the elevation of the liquid surface at 15 and is therefore submerged in the liquid 14.

An inlet duct 23 is provided for directing a stream of pressurized gas and particulate material or aerosol to a submerged location vertically beneath the porous bed 21. This is illustrated as a vertical tube made of gas impervious material and extending through the center of the porous bed 21. The inlet duct 23 terminates at an open bottom end 24 positioned at an elevation between the bottom of porous bed 21 and the lower end 18 of the gas impervious container side walls 17.

The top end of the porous bed 21 is illustrated as being covered by a transverse porous or perforated plate 25. While such a plate is desirable, it is not always necessary to keep bed 21 confined. The top end of bed 21 is transversely open to liquid flow to thereby permit liquid entrained with the stream of gas to be returned by gravity over the sides of container 16 to the liquid 14 within the interior liquid tank provided by enclosure 10.

Various materials might be used within porous bed 21. The porous material should be insoluble in the liquid. It might constitute natural or artificial sand or gravel, fibrous materials, or other packing materials commonly used in either dry or wet filters.

An outlet duct 26 is open through enclosure 10 at an elevation above the liquid surface at 15. Duct 26 discharges the stream of gas following its passage through the porous bed 21.

The presence of the gas within the container 16 that surrounds the porous bed 21 reduces the apparent density of the liquid 14 within the bed confines. Consequently, as the gaseous stream rises through bed 21, liquid flows from within enclosure 10 into the bottom of the bed, moves upwardly, and subsequently spills over the top. Collected aerosol within porous bed 21 is thereby continuously washed from it. This passive, self-cleaning function of the porous bed 21 is one of the novel features of this device.

The illustrated apparatus effectively removes aerosols from a gaseous stream. The efficiency of aerosol removal can be adjusted by modifying the depth of the porous bed 21, the size of the packing materials comprising bed 21 and the velocity of the gaseous stream directed through the inlet duct 23 and bed 21. The only limitation as to the amount of collected material which can be accommodated by the apparatus is the volume of the pool of liquid 14 and the solubility of the removed aerosol materials within the liquid. Another limit is the volume of insoluble particles that can be accommodated within the enclosure 10.

The scrubber is a three phase liquid scrubber. The solid phase, comprising the porous material within the bed 21, is fixed in place. The gas and liquid phases flow concurrently through bed 21. Because of the complexity of such a system, tests were conducted to both develop the concept and measure scrubber performance.

A prototype scrubber was constructed substantially as shown in FIG. 1. The bed was 0.30 m in diameter, 0.61 m deep, and was packed with basalt rock seived to between $+0.91$ cm and $-1.27$ cm. The cross-sectional area available for gas flow was 0.069 m$^2$. The bed void fraction was $0.45 + 0.050$.

The granular basalt rock used in these tests is characterized as having no smooth sides. It was screened by hand into three segments. It was retained between horizontal plates 22 and 25 across the container side walls 17. Plates 22 and 25 as tested were made from solid flat sheets with apertures formed through them in a staggered pattern and a central aperture to receive the inlet duct 23. A second type of support plate usable in this apparatus could be fabricated from suitable screen material.

It is to be noted that the lower end 18 of the container side walls 17 is provided with openings 27. They are spaced above the bottom wall 11 of enclosure 10 to prevent re-entrainment of insoluble solids within the liquid and gas stream moving into porous bed 21. The openings 27 permit flow of liquid 14 beneath the porous bed 21. The areas between the openings 27 and the bottom of bed 21 constitutes a surrounding skirt within which incoming gas briefly accumulates before it moves upwardly through the porous bed 21.

As is evident from FIG. 1, the horizontal cross-sectional area of container 16 is substantially less than the interior horizontal cross-sectional area within the enclosure 10. The cross-sectional area of container 16 is a function of the volume of gas which must be passed upwardly through bed 21. The cross-sectional area and depth of liquid 14 within enclosure 10 is a function of the storage capability required for handling aerosol removed from the stream of gas.

The upright side walls 12 of enclosure 10 are spaced transversely outward from the side walls 17 of the container 16. This permits flow of liquid into the container 16 from all sides through the openings 27 and permits the liquid exiting from container 16 to spill about its entire periphery.

The specific example of the scrubber utilized cylindrical side walls about the container 16, arranged vertically and centered about a vertical inner axis along the center of the illustrated inlet duct 23. The duct 23 was constructed as a straight vertical tube coaxially centered within the bed 21 along the vertical container axis.

A series of tests were conducted using various sodium-compound aerosols to measure aerosol removal efficiency, using water as the wash liquid within enclosure 10. Table I lists the test parameters showing gas velocity based on a bed cross section area of 0.069 m$^2$. The flow rate of the gaseous stream was varied during each test and aerosol samples were periodically taken from both the inlet duct 23 and the outlet duct 26. A conventional dry filter was placed downstream of the scrubber in the outlet duct 26 and was leached and analyzed for sodium following each test.

The results of the tests are summarized in Table II. The overall efficiency was calculated using the total mass of sodium collected in the scrubber solution and on the fibrous filter. The average efficiency was calculated by the arithmetic average of individual efficiencies determined from instantaneous gas concentration measurements. This data indicates that changing the granular sizes within bed 21 had no effect on collection. Reducing the bed height by a factor of 2 increased aerosol penetration by a factor of 7.

TABLE I

| | | Test Conditions | | |
|---|---|---|---|---|
| Test | Aerosol Source | Aerosol Type | Test Duration (HR) | Superficial Gas Velocity (m/Min) |
| 1. | Spray Fire | Na$_2$CO$_3$ | 9.7 | 2.–30. |
| 2. | Pool Fire | Na$_2$O$_2$ | 4.3 | 1.2–22. |
| 3. | Pool Fire | Na$_2$O$_2$ | 2.7 | 2.–27. |
| 4. | Pool Fire | Na$_2$O$_2$ | 4.0 | .8–20. |
| 5. | Spray Fire | NaOH | 24. | 17.–27. |

TABLE II

| | | Test Results | | |
|---|---|---|---|---|
| Test | Overall Efficiency | Average Efficiency | Na Mass Collected (grams) | Parameter Tested |
| 1. | 99.8 | 99.18 | 748 | Type of aerosol |
| 2. | 99.8 | 99.97 | 590 | Type of aerosol |
| 3. | 98.6 | 98.78 | 401 | Reduced bed height (.305 m) |
| 4. | 99.8 | 99.97 | 566 | Reduced size of packing (.64–.95 cm) |
| 5. | 99.996 | 99.998 | 4517 | Fiber element added |

Figure 2:
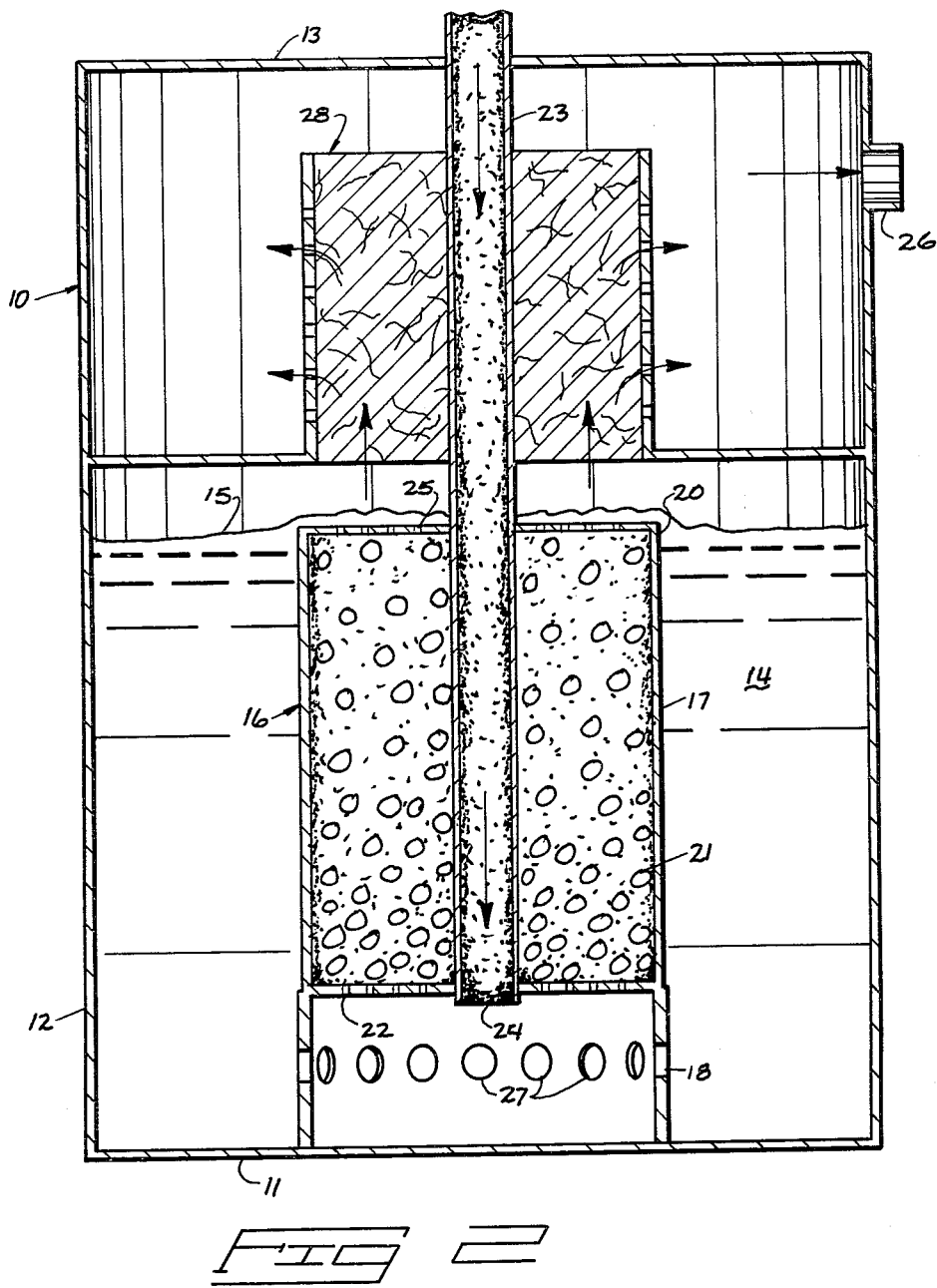
FIG. 2 shows a modified scrubber.

In the final test listed in Tables I and II, a polypropylene fiber element was added to the scrubber to eliminate mist entrainment and to enhance capture of small particles. The fiber unit measured 0.61 m OD by 0.46 m ID by 0.61 m long. It was placed directly over the porous bed 21. Gas leaving the bed 21 flowed upward into the central region of the fiber unit and then horizontally through the fibrous materials. Water droplets entrained in the gas that left the porous bed 21 continuously washed the collected aerosol from the fiber unit. The particular test reported in Tables I and II was performed using a NaOH aerosol. The pressure drop across the fiber unit remained constant throughout the test, indicating that the fibers within it were sufficiently washed by the entrained water. This demonstrated the increased removal efficiency available by combining the hybrid scrubber with an available fibrous filter. A schematic illustration of this modified scrubber is shown in FIG. 2. The fiber unit is indicated at 28. All other elements of the apparatus are as previously disclosed, and are indicated by the reference numerals previously explained.

Hydraulic tests were performed without aerosols for various bed configurations to measure pressure drop, water circulation rate, and water level effects. Pressure drop through the porous bed 21 was found to be independent of gas flow rate at rates between gas superficial velocities of 0.002 to 0.507 m/s. The pressure drop through the apparatus was found to be primarily due to the static liquid head at the submerged open bottom end 24 of inlet duct 23. The internal water circulation rate was found to be a function of the gas flow rate, bed depth, granular size and inlet duct submergence. In checking water flow rate versus gas flow rate for various bed parameters using a granular rock bed, water was found to be pumped at a decreasing rate as the water level dropped until the level was down to about one half the bed depth. The test parameter having the greatest effect on water flow rate was the depth of submergence of the inlet duct 23.

The present apparatus is capable of handling a gaseous stream at pressures of 10–50 psi, which are typically containment pressures for vessels utilized in nuclear reactor installations. Gaseous streams vented from such containment vessels may be throttled as necessary in order to meet flow rate limitations of a particular scrubber apparatus. No other pumping of the gaseous stream is required, thereby eliminating any energy requirements for activation of the scrubber.

The tests conducted on the experimental model indicate that a passive self-cleaning aerosol scrubber can be designed based on a superficial gas velocity of 0.507 m/s and a bed depth of 0.608 m. The aerosol removal efficiency can be predicted to exceed 99% for the aerosols that might be expected in a nuclear installation. Aerosol removal efficiency would exceed 99.9% for all feasible particle distributions if a passive fibrous filter is included as indicated in FIG. 2.

In this apparatus, an airlift is used to circulate wash liquid through the packing within porous bed 21. The packing is kept clean during use of the scrubber without requiring utilization of external liquid pumps, which would in turn require a source of energy. This is extremely important under those conditions where electric power is not available.

Removal efficiency of the scrubber can be designed to have the value required for any particular application. A high removal efficiency for small particles can be realized. This is a distinct advantage over submerged tubes, where large bubbles lead to low removal efficiencies for finer particles.

Because the porous bed 21 is continually wetted, trapped dust will be either dissolved or washed from the bed material. Therefore, large masses of airborne particles can be trapped without plugging the porous bed 21.

As compared to a simple submerged tube, this apparatus has a much lower pressure drop in a device designed to yield the same removal efficiency. This results from the breaking of the gas stream into small parcels as it enters the porous bed 21.

All of the flow paths through the porous bed 21, which are small in size, are washed by the liquid and therefore will not plug. The inlet duct, which is not washed, can be as large as desired to assure that plugging will be prevented. This is a great improvement over other bubble breakup devices, such as the use of small diameter submerged tubes.

The present device can be built of simple, readily available components which are easily fabricated. It should be capable of being constructed at relatively low cost.

The apparatus has high reliability and can perform as designed after years of non-operating stand-by status. Only the liquid level would need to be maintained periodically. No intricate parts or controls are needed for the functioning of the scrubber and no auxiliary power is required. The device therefore has a few failure modes, and very high reliability.

Having described my invention, I claim:

1. A method of removing particulate matter from a stream of pressurized gas comprising:
   (a) providing an open ended container having gas impervious upright side walls, (b) substantially filling the open ended container with a porous bed, (c) surrounding the open ended container with a liquid tight enclosure so as to create an annular space between the open ended container and the liquid tight enclosure, (d) partially filling the liquid tight enclosure so as to submerge the porous bed to at least half its vertical height, (e) directing a stream of pressurized gas and particulate matter to a submerged location vertically beneath the porous bed, (f) passing the stream of gas through the porous bed so as to remove the particulate matter and to reduce the density of liquid within the porous bed and to cause the liquid in the porous bed to be pumped up over the side walls of the open ended container and into the annular space due to the density difference between the liquid in the porous bed and the annular space and to further cause liquid to flow from the annular space into the porous bed through the bottom of the open ended container to replace the pumped liquid, thereby creating a circulation of liquid between the porous bed and the annular space which cleans particulate matter from the porous bed by said liquid circulation.

* * * * *